US009534974B2

(12) United States Patent
Vaiana et al.

(10) Patent No.: US 9,534,974 B2
(45) Date of Patent: Jan. 3, 2017

(54) INTEGRATED TRANSDUCER PROVIDED WITH A TEMPERATURE SENSOR AND METHOD FOR SENSING A TEMPERATURE OF THE TRANSDUCER (71) Applicant: STMicroelectronics S.r.l., Agrate Brianza (IT)

(72) Inventors: Michele Vaiana, Paterno (IT); Mario Chiricosta, Messina (IT); Mario Maiore, Catania (IT); Lorenzo Baldo, Bareggio (IT); Paul Georges Marie Rose, Lodi (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 634 days.

(21) Appl. No.: 13/757,146

(22) Filed: Feb. 1, 2013

(65) Prior Publication Data
US 2013/0215931 A1 Aug. 22, 2013

(30) Foreign Application Priority Data

Feb. 17, 2012 (IT) .............................. TO2012A0145

(51) Int. Cl.
  G01K 7/00 (2006.01)
  G01L 19/00 (2006.01)
  (Continued)

(52) U.S. Cl.
  CPC ............. *G01L 19/0092* (2013.01); *G01K 7/01* (2013.01); *G01L 9/0054* (2013.01); *G01L 9/065* (2013.01)

(58) Field of Classification Search
  USPC .......................................... 374/178, 183, 110
  See application file for complete search history.

(56) References Cited

U.S. PATENT DOCUMENTS 4,300,395 A    11/1981   Shirouzu et al.
5,100,829 A *   3/1992   Fay ..................... H01L 27/0248
                                       257/337

(Continued)

OTHER PUBLICATIONS

Italian Search Report and Written Opinion for IT TO2012A000145 mailed Feb. 18, 2013 (8 pages).

(Continued)

*Primary Examiner* — Mirellys Jagan
(74) *Attorney, Agent, or Firm* — Gardere Wynne Sewell, LLP (57) ABSTRACT A pressure sensor includes a body made of semiconductor material having a first type of conductivity and a pressure-sensitive structure having the first type of conductivity defining a suspended membrane. One or more piezoresistive elements having a second type of conductivity (P) are formed in the suspended membrane. The piezoresistive elements form, with the pressure-sensitive structure, respective junction diodes. A temperature sensing method includes: generating a first current between conduction terminals common to the junction diodes; detecting a first voltage value between the common conduction terminals when the first current is supplied; and correlating the detected first voltage value to a value of temperature of the diodes. The temperature value thus calculated can be used for correcting the voltage signal generated at output by the pressure sensor when the latter is operated for sensing an applied outside pressure which deforms the suspended membrane.

17 Claims, 8 Drawing Sheets (51) Int. Cl.
*G01K 7/01* (2006.01)
*G01L 9/00* (2006.01)
*G01L 9/06* (2006.01)

(56) References Cited

U.S. PATENT DOCUMENTS

| | | | | |
|---|---|---|---|---|
| 5,303,594 | A * | 4/1994 | Kurtz | G01L 9/0055 338/4 |
| 5,869,878 | A * | 2/1999 | Hasegawa | G01K 7/01 257/341 |
| 2003/0176850 | A1* | 9/2003 | Melvas | A61B 5/02158 604/533 |
| 2004/0071189 | A1* | 4/2004 | Tanaka | G01K 15/005 374/183 |
| 2006/0029123 | A1* | 2/2006 | Johnson | G01K 15/00 374/178 |
| 2009/0129440 | A1* | 5/2009 | Opitz | G01J 5/10 374/178 |
| 2009/0296780 | A1 | 12/2009 | Lee et al. | |
| 2010/0161261 | A1 | 6/2010 | Drapkin et al. | |
| 2010/0166036 | A1* | 7/2010 | Saw | G01K 7/01 374/178 |
| 2011/0013670 | A1* | 1/2011 | Tustaniwskyj | G01K 7/01 374/183 |
| 2011/0031903 | A1* | 2/2011 | Nguyen Hoang | G01K 7/01 315/309 |
| 2011/0268151 | A1* | 11/2011 | Hadwen | B01L 3/502792 374/141 |
| 2012/0125114 | A1* | 5/2012 | Stewart | G01L 9/065 73/721 |
| 2013/0051428 | A1* | 2/2013 | Wang | G01K 7/015 374/152 |
| 2014/0139246 | A1* | 5/2014 | Chuang | G01R 31/2874 324/750.06 |

OTHER PUBLICATIONS

Shotter, Tim: "All Sensors(r)," 2007, www.allsensors.com (4 pages).

Peng, J.H., et al: "The Temperature Compensation of the Silicon Piezo-Resistive Pressure Sensor Using the Half-Bridge Technique," Reliability, Testing, and Characterization of MEMS/MOEMS III, edited by Danelle M. Tanner, Rajeshuni Ramesham, Proceedings of SPIE vol. 5343 (SPIE, Bellingham, WA, 2004), pp. 292-301.

* cited by examiner

INTEGRATED TRANSDUCER PROVIDED WITH A TEMPERATURE SENSOR AND METHOD FOR SENSING A TEMPERATURE OF THE TRANSDUCER

PRIORITY CLAIM

This application claims priority from Italian Application for Patent No. TO2012A000145 filed Feb. 17, 2012, the disclosure of which is hereby incorporated by reference.

TECHNICAL FIELD

The present invention relates to a transducer, in particular a piezoresistive pressure sensor, provided with a temperature sensor, and to a method for sensing a temperature of said transducer.

BACKGROUND

Known to the art are micromachining techniques for providing integrated pressure sensors made of semiconductor material. Said sensors present numerous advantages in terms of low cost, high degree of functionality and reliability, good signal-to-noise ratio, integrability with memory circuits to obtain smart sensors, and high reproducibility. Semiconductor pressure microsensors present on the market are essentially based upon two physical effects: the piezoresistive effect, whereby the deflection of a silicon membrane caused by the pressure unbalances a Wheatstone bridge provided with resistances diffused in the membrane; and the capacitive effect, whereby the pressure induces displacement of a membrane that constitutes the mobile electrode of a capacitor (thus determining variation of capacitance thereof). In what follows only pressure sensors that use the first effect, i.e., piezoresistive sensors, will be considered.

A method of manufacture of a piezoresistive pressure sensor of a known type is described, for example, in European Patent No. 822398 or in European Patent No. 1577656, the disclosures of which are incorporated by reference. The membranes of said sensors, in order to guarantee proper operation, must have a well-controlled homogeneous thickness and moreover must not present intrinsic mechanical stresses (of a tensile and compressive nature). A method of fabrication of a membrane designed for use in piezoresistive pressure sensors is, for example, described in U.S. Pat. No. 7,871,894, the disclosure of which is incorporated by reference.

One of the main disadvantages of piezoresistive pressure sensors is the high thermal drift, that they undergo as the temperature varies. In the absence of compensation, a variation temperature of approximately 10° C. in a piezoresistive pressure sensor can cause a non-negligible drift of the output signal, in particular for applications that require high sensitivity (e.g., medical applications such as artificial breathers, spirometers, altimeters, barometers, etc.). For this reason, it is necessary to equip these sensors with a system for compensation of thermal drift. One of the known methods comprises inserting said sensors in a transduction circuit based upon the Wheatstone bridge. This modality envisages inserting on the opposite branch of the bridge piezoresistive elements that are substantially the same as those mounted on the sensor element, but arranged so as not to undergo deformations linked to the pressure applied to the membrane. As the temperature varies, all the piezoresistors undergo approximately the same thermal drifts. In this way, the elements used for compensation rebalance the Wheatstone bridge, reducing the dependence of the output pressure signal upon the temperature of the transducer.

However, on account of variations of layout of the sensor, variations of morphology of the piezoresistors linked to spreads of the manufacturing process, local concentrations of impurities, and in general other conditions of physical mismatch, also in the case of Wheatstone-bridge connection of the piezoresistors, variations of the pressure signal at output from the bridge are not completely independent of temperature variations of the sensor. A further step of compensation of the variations of the output signal caused by the temperature is consequently necessary. For this purpose, it is necessary to acquire a signal correlated to the temperature to which the piezoresistors are subjected in use. There has consequently been proposed temperature sensors located in the proximity of the pressure sensor, adapted to be used for thermal compensation of the pressure sensor. Said double-sensor systems show a temperature gradient between the temperature sensor and the membrane of the sensor, on account of the different physical location. The time that elapses for stabilization of the temperature gradient is known as "warm-up drift".

A solution to this problem has, for example, be proposed by Kuo Huan Peng, C. M. Tiang, and Yih Min Chang. "The temperature compensation of the silicon piezoresistive pressure sensor using the half-bridge technique", Proc. SPIE 5343, 292 (2004), the disclosure of which is incorporated by reference. In this document, the output drift of the bridge due to the variation in temperature is minimized by means of auto-gain circuits (AGCs) for adjusting automatically the voltage supplied to the bridge. This solution presents, however, certain disadvantages. In particular, the size of the pressure sensor is considerably increased for housing the temperature-sensing circuit. In addition, a high number of pads are used for biasing correctly both the piezoresistors and the temperature-sensing circuit.

There exists a need in the art to provide a transducer equipped with a temperature sensor, and a method for sensing a temperature of said transducer.

SUMMARY

According to the present invention a transducer equipped with a temperature sensor and a method for sensing a temperature of said transducer are provided.

In an embodiment, a method is presented for sensing a temperature of a transducer. The transducer has a body including a sensing structure of semiconductor material having a first type of conductivity, said sensing structure housing a first transducer element having a second type of conductivity, said first transducer element forming with said sensing structure first junction diode. The method comprises: generating a first current through said first junction diode; detecting a first voltage value across said first junction diode when the first current is supplied; and correlating said detected first voltage value to a value of a temperature of said first junction diode.

In an embodiment, a transducer comprises: a body including a sensing structure made of semiconductor material having a first type of conductivity; a first transducer element, extending in said sensing structure, having a second type of conductivity, and forming with said sensing structure a first junction diode; a current generator connected between the first transducer element and the sensing structure configured to supply a first current through the first junction diode; a voltage-measuring device connected between the first transducer element and the sensing structure and configured to detecting a first voltage value across the first junction diodes when the first current is supplied; and a processing device configured to acquire the first value of the voltage detected and correlating said first voltage value to a value of temperature of the first junction diode.

In an embodiment, an apparatus comprises: a membrane formed of a first conductivity type semiconductor material; a sensor element within the membrane formed of a second conductivity type semiconductor material; wherein the sensor element and membrane form a junction diode; a first circuit coupled to the sensor element and configured to sense resistive variation of the sensor element in response to deflection of the membrane; and a second circuit coupled to the junction diode and configured to sense a voltage across the junction diode in response to application of a current and determine from the sensed voltage a temperature of the junction diode.

In embodiment a method comprises: sensing resistive variation of a sensor element in response to deflection of a membrane, said membrane formed of a first conductivity type semiconductor material and said sensor element formed of second conductivity type semiconductor material located within the membrane; wherein the sensor element and membrane form a junction diode; sensing a voltage across the junction diode in response to application of a current; and determining from the sensed voltage a temperature of the junction diode.

BRIEF DESCRIPTION OF THE DRAWINGS

For a better understanding of the present invention, preferred embodiments thereof are now described, purely by way of non-limiting example, with reference the attached drawings, wherein.

DETAILED DESCRIPTION OF THE DRAWINGS

The present invention regards a transducer, in particular obtained with MEMS technology, provided with a temperature sensor integrated in the same substrate or body as the one that houses the transducer. According to an embodiment of the present invention, the transducer is a pressure sensor comprising a sensing structure adapted to detect an external pressure applied. The sensing structure is, in particular, a flexible membrane provided with one or more piezoresistors that vary their own value of electrical resistance as a function of the deflection of the membrane when the external pressure is applied.

In what follows, the transducer is designated as a whole by the reference number 100, and is manufactured according to techniques of a known type. Described hereinafter are some steps for manufacturing a pressure sensor provided with a flexible membrane, in which the displacement of the membrane from a resting position to an operative position is detected by using piezoresistors. Application of a pressure P on the membrane causes, as known, a variation of the value of resistance of the piezoresistors. Said variation of the value of resistance can be associated to an amount of displacement of the membrane, and hence to a value of the pressure P applied.

Figure 1:
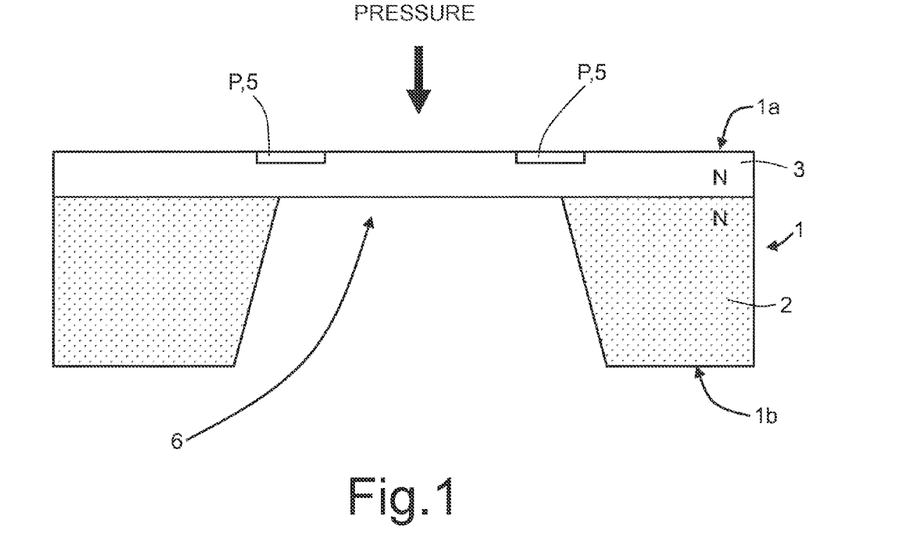
FIG. 1 is a cross-sectional view of a MEMS piezoresistive pressure-sensor device.

The steps of fabrication of the transducer 100 are described in what follows with reference to FIG. 1. First of all, a wafer 1 of semiconductor material is provided, having a front side 1a and a rear side 1b. The wafer 1 comprises, according to an embodiment, a silicon substrate 2 with doping of an N type and an epitaxial layer 3, which is also made of silicon with doping of an N type. The substrate 2 and the epitaxial layer 3 form, as a whole, a semiconductor body. The semiconductor body can be formed of, or comprise, semiconductor materials different from silicon. Next, provided in the epitaxial layer 3 are piezoresistors 5 (two piezoresistors are shown in cross-sectional view in FIG. 1a). The piezoresistors 5 are typically formed by means of a step of implantation, in the epitaxial layer 3, dopant species of a P type, and subsequent process of thermal diffusion.

Next, the wafer 1 is masked so as to cover the rear side 1b except for an area of the rear side 1b in which it is desired to form the membrane of the transducer 100. Then, an etch is made of the rear side 1b of the wafer 1 (for example, an anisotropic etch) so as to remove exposed portions of the substrate 2. Between the substrate 2 and the epitaxial layer 3 there can be provided (in a way not shown in FIG. 1) an etch-stop layer. In this way, etching of the substrate 2 stops at the etch-stop layer and does not proceed towards the epitaxial layer 3. A suspended membrane 6 is thus formed, constituted by portions of the epitaxial layer 3 suspended above the cavity formed in the substrate 2 by means of the previous etching step. The piezoresistors 5 extend into peripheral regions of the suspended membrane 6, in areas corresponding to portions of the latter more subject to stresses when the suspended membrane 6 deflects in use.

Figure 2:
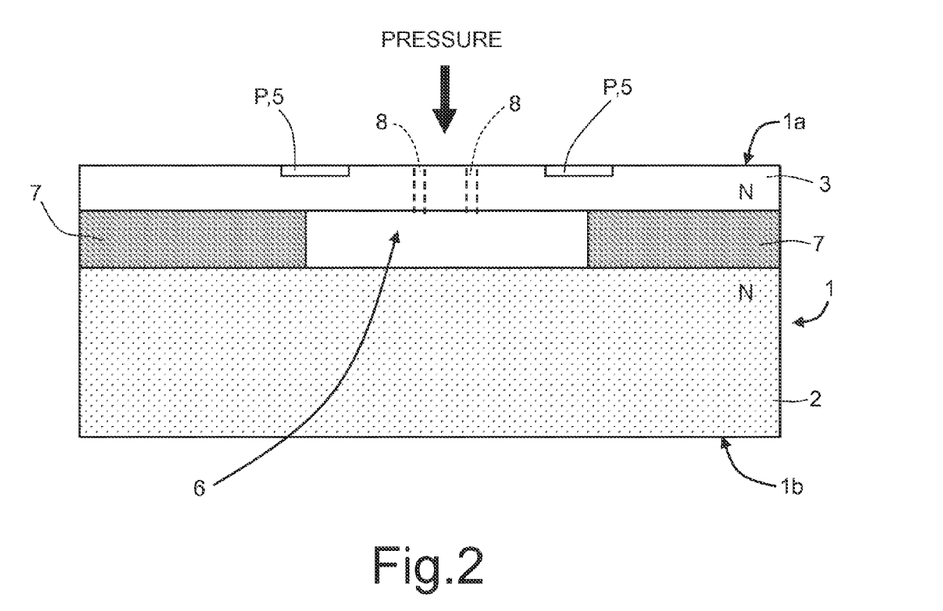
FIG. 2 is a cross-sectional view of a MEMS piezoresistive pressure-sensor device.

According to different embodiments, the suspended membrane 6 can be formed without the need to etch the wafer 1 from the rear side 1b. Said variant is shown in FIG. 2 in which, formed between the substrate 2 and the epitaxial layer 3, is an interface layer 7, made, for example, of silicon nitride. In general, the interface layer 7 is made of a material that can be selectively removed without damage to the substrate 2 and the epitaxial layer 3. Next, by means of a masked etch, trenches 8 are formed at the front side 1a of the wafer 1, through the epitaxial layer 3 until the interface layer 7 is reached. A subsequent wet-etching step through the trenches 8 thus formed enables selective removal of portions of the interface layer 7 extending underneath the epitaxial layer 3 to form the suspended membrane 6. The piezoresistors 5 extend in peripheral regions of the suspended membrane 6 thus formed, in areas corresponding to portions of the latter more subject to stress when the suspended membrane 6 deflects in use.

It is evident that other embodiments are possible. In particular, the substrate 2 and the epitaxial layer 3 can be replaced by a SOI (silicon over insulator) substrate.

Irrespective of the way in which the suspended membrane 6 is obtained, electrical-contact pads (not shown in FIGS. 1 and 2) are moreover formed above the epitaxial layer 3 and in electrical contact with each piezoresistor 5. The electrical-contact pads are, for example, made of metal material. The electrical-contact pads can be formed on the wafer 1 at distance from the respective piezoresistors 5, and electrically connected to the latter by means of conductive paths (which are also, for example, made of metal material). Typically, a dielectric layer extends between the epitaxial layer 3 and the conductive paths in such a way that the latter are electrically insulated from the epitaxial layer 3.

Figure 3:
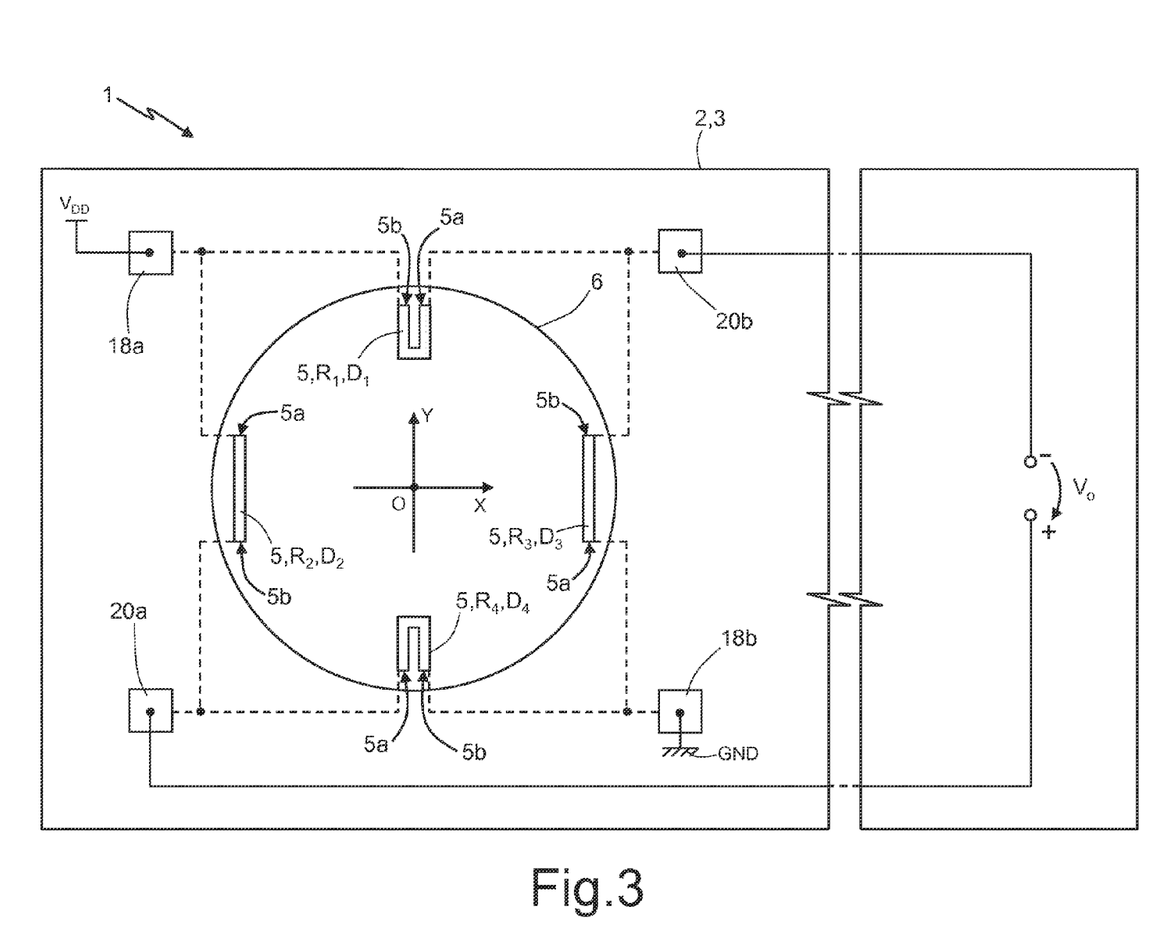
FIG. 3 shows, in top plan view, a MEMS piezoresistive pressure-sensor device, according to any of the embodiments of FIGS. 1 and 2.
Figure 4:
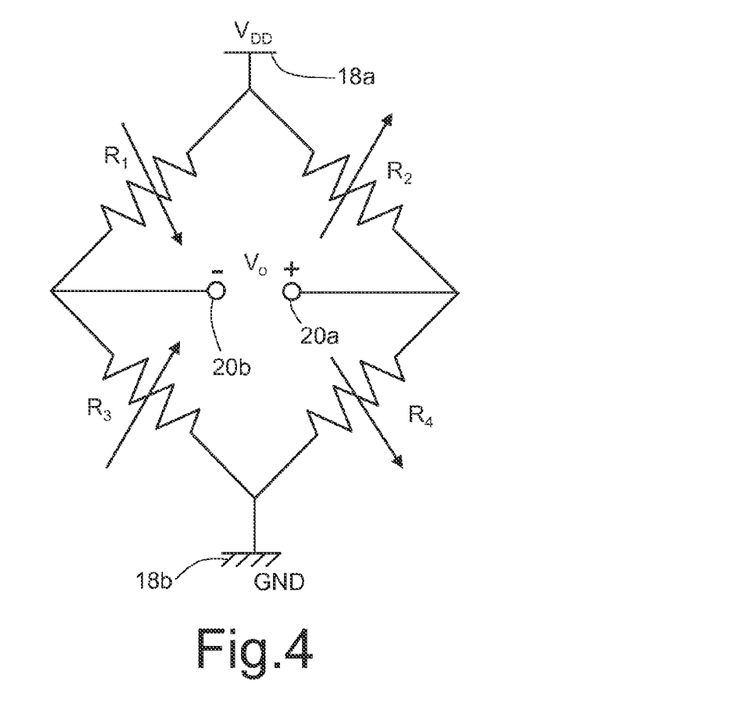
FIG. 4 is an equivalent circuit that represents the Wheatstone-bridge connection of the piezoresistors of the transducer of FIG. 3.

It is thus possible, in use, to bias the piezoresistors 5 so as to provide a Wheatstone-bridge connection (see, for example, FIGS. 3 and 4).

FIG. 3 shows, in top plan view, a suspended membrane 6 provided with four piezoresistors 5. The suspended membrane 6 of FIG. 3 has a circular shape, but other shapes are possible, for example, a quadrangular shape. Two piezoresistors 5 extend aligned to one another along an axis X passing through the centre O of the suspended membrane 6 (i.e., specular with respect to an axis Y passing through the center O of the suspended membrane 6 and orthogonal to the axis X); another two piezoresistors 5 extend aligned to one another along the axis Y passing through the center O of the suspended membrane 6 (i.e., specular with respect to the axis X).

Each piezoresistor 5 has a first conduction terminal 5a and a second conduction terminal 5b, and each conduction terminal 5a, 5b is electrically coupled to a respective pad formed on the front side 1a of the wafer 1 (in FIG. 3 said connection is represented by a dashed line). In FIG. 3 the pads are shown schematically and identified by the reference numbers 18a, 18b, 20a, 20b. Moreover, piezoresistors 5 immediately adjacent to one another along the perimeter of the suspended membrane 6 have a respective conduction terminal 5a, 5b electrically coupled to one and the same pad 18a, 18b, 20a, 20b, in such a way that the four piezoresistors 5 are connected to one another in Wheatstone bridge configuration (see also FIG. 4).

As has been said, the piezoresistors 5 are obtained from regions with a doping of a P type extending in the epitaxial layer 3 of an N type. Each piezoresistor 5 forms, with the epitaxial layer 3, a respective diode (PN junction). In particular, four diodes are present (D1-D4 in FIG. 5), each formed by a respective piezoresistor 5 (P) and by the epitaxial layer 3 (N). The epitaxial layer 3 has the function of conduction terminal 21 common to all the diodes thus formed.

Figure 5:
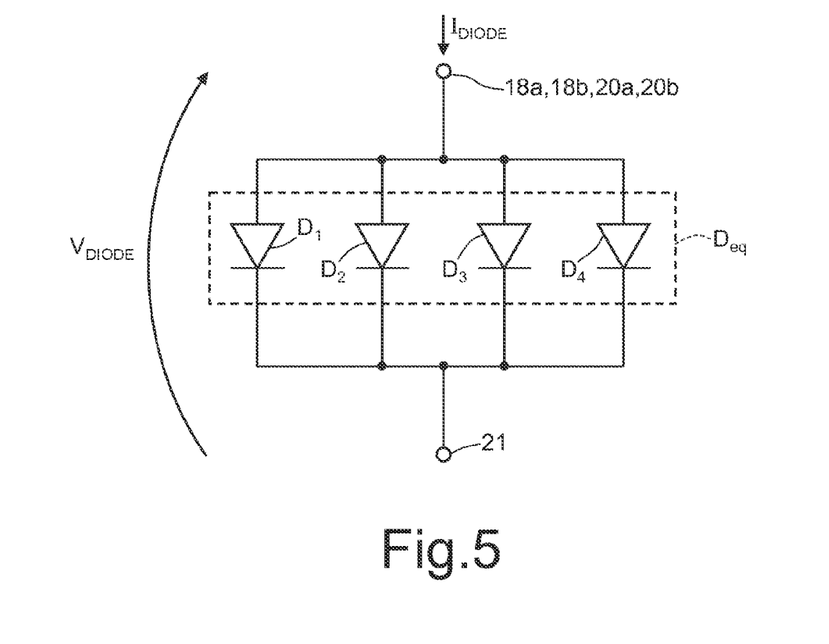
FIG. 5 is an equivalent circuit that illustrates parasitic diodes of the transducer according to any one of the embodiments of FIGS. 1 and 2.

By electrically connecting the pads 18a, 18b, 20a, 20b to one and the same conduction terminal, all the diodes D1-D4 are connected between the same conduction terminals, and are hence connected together in parallel. Since the diodes D1-D4 thus connected have the conduction terminals in common, they can be viewed as a single equivalent diode $D_{eq}$. The current-voltage (I-V) characteristic of the equivalent diode $D_{eq}$ obtained by connecting in parallel the diodes D1-D4 as the pressure varies does not undergo variations since the variations of the individual diodes D1, D3 and D2, D4 are complementary to one another in current and compensate one another. In other words, as the pressure varies, the I-V characteristic of the equivalent diode $D_{eq}$ can be considered also as "equivalent" to that of a diode of area equal to the sum of the areas of the diodes D1-D4 and a characteristic, with unit area, equal to that obtained from the average of the characteristics of the diodes D1, D3 or of the diodes D2, D4.

The equivalent diode $D_{eq}$ is used as a temperature sensor integrated in the wafer 1, set in the area of the transducer 100 and hence not subject to warm-up drift phenomena.

According to one embodiment, the method for sensing the value of temperature to which the transducer 100 is subject in use, comprises the following steps: supplying a current $I_{DIODE}=I_1$, having a first known value, to the diodes D1-D4 connected together in parallel as shown in FIG. 5; detecting a voltage value $V_{DIODE}=V_1$ across the diodes D1-D4 connected in parallel when the current $I_{DIODE}=I_1$ is supplied; and correlating the voltage value $V_{DIODE}=V_1$ thus detected to a temperature value (for example, by means of linear association between the voltage value $V_{DIODE}=V_1$ detected and the temperature value that is to be obtained). The latter correlating step is rendered possible by the fact that the evolution of the voltage across a diode (and equivalently across the diodes D1-D4 connected in parallel) varies according to a known law that depends upon the temperature at which the diode operates. This law is described in what follows (see Eq. (3)).

During use of the diodes D1-D4 as a temperature sensor, the immediate association between a voltage value $V_{DIODE}$ and the temperature at which the diodes D1-D4 operate is obtained using an appropriate correlation function (if we assume that the diodes D1-D4 operate in the linear region, said function is a linear function). This function can be defined by the producer of the pressure sensor, at start of its life, or, alternatively, by the user of the pressure sensor. It is moreover possible to envisage automatic steps of updating of said function to be performed automatically during the service life of the pressure sensor. The method for obtaining said function is described in detail hereinafter (Eqs. (8)-(11b)).

According to a different embodiment, the method described above can be implemented by applying the current $I_1$ to a single diode chosen from among the diodes D1-D4, and detecting the voltage $V_1$ across said diode. Alternatively, the method described above can be implemented by applying the current $I_1$ to a plurality of diodes, connected together in parallel, chosen as subset of the diodes D1-D4 (for example, to just the diodes D1, D2), and detecting the voltage across said diodes.

According to a further embodiment, the method for sensing the value of temperature to which the transducer 100 is subject in use comprises the following steps: supplying a current $I_{DIODE}=I_1$, having a first known value, to the diodes D1-D4 connected together in parallel as per FIG. 5; detecting a voltage value $V_{DIODE}=V_1$ across the diodes D1-D4 connected in parallel when the current $I_{DIODE}=I_1$ is supplied; supplying a second current $I_{DIODE}=I_2$, having a value different from the value of the first current $I_{DIODE}=I_1$ to the diodes D1-D4 connected in parallel as per FIG. 5; detecting a second voltage value $V_{DIODE}=V_2$ across the diodes D1-D4 connected in parallel when the current $I_{DIODE}=I_2$ is supplied; carrying out an operation subtraction between the first value and the second value of the voltage detected (i.e., $V_1-V_2$) obtaining a difference value $\Delta V_{DIODE}$; and associating the difference value to a temperature value. This latter associating step is rendered possible by the fact that the evolution of the differential voltage $\Delta V_{DIODE}$ across a diode (and equivalently across the diodes D1-D4 connected in parallel)

varies with a known law that depends upon the temperature at which the diode operates. This law is described in what follows (see Eq. (6)). According to a different embodiment, also this further embodiment of the method can be implemented by applying the currents $I_1$, $I_2$ to a single diode chosen from among the diodes D1-D4, and detecting the voltages $V_1$, $V_2$ across said single diode. Alternatively, the same method can be implemented by applying the currents $I_1$, $I_2$ to a plurality of diodes, connected together in parallel, chosen as subset of the diodes D1-D4 (for example, to just the diodes D1, D2), and detecting the voltages $V_1$, $V_2$ across said diodes.

To understand in greater detail how the equivalent diode $D_{eq}$ is used for measuring the temperature of the wafer 1, some equations describing operation of a diode as temperature sensor are here introduced. The current $I_{DIODE}$ that flows through the equivalent diode $D_{eq}$ when it is biased at a voltage $V_{DIODE}$, is given, as is known, by the following Eq. (1)

$$I_{DIODE} = I_S e^{\frac{V_{DIODE}}{nV_T}} \quad (1)$$

where $V_{DIODE}$ is the voltage applied across the equivalent diode, between the terminal 21 and the terminals 18a, 18b, 20a, 20b; $I_S$ is a constant that depends upon a plurality of factors, amongst which the equivalent area of the diode $D_{eq}$ and its temperature (in particular, $I_S=J_S \cdot A_D$, where $J_S$ is the charge density, variable with the temperature, and $A_D$ is the equivalent area of the diode $D_{eq}$); and n is the coefficient of emission (constant), which can be approximated with the value 1 in the case of a silicon diode and for low values of current $I_{DIODE}$.

The factor $V_T$ in Eq. (1) is the thermal voltage and is given by $$V_T = \frac{KT}{q} \quad (2)$$

where K is the Boltzman constant; T is the absolute temperature (in degrees Kelvin); and q is the charge of an electron.

A diode biased with a constant current shows, typically, a variation of the voltage across it of the order of approximately −2 mV/° C. This variation is due to the dependence of Eq. (1) upon the temperature; in particular, the term $I_S$ varies as the temperature varies doubling its own value every approximately 5° C., whilst the term $V_T$ varies according to Eq. (2).

It is evident that the temperature of the diode $D_{eq}$ is linked to the voltage $V_{DIODE}$ that is set up across its conduction terminals. The temperature of the diode $D_{eq}$ can be measured by measuring the voltage $V_{DIODE}$ when flowing through the diode $D_{eq}$ is a current $I_{DIODE}$ of constant value. However, the value obtained from said measurement is subject to a plurality of unforeseeable variations, such as spread of the process of fabrication of the diodes (in particular, spread of the process of fabrication of the epitaxial layer 3, of the piezoresistors 5, etc.). In order to overcome said drawback, it is advisable to measure differential voltage $\Delta V_{DIODE}$ as a function of two different values of constant current that is made to flow through the diode $D_{eq}$.

Figure 6:
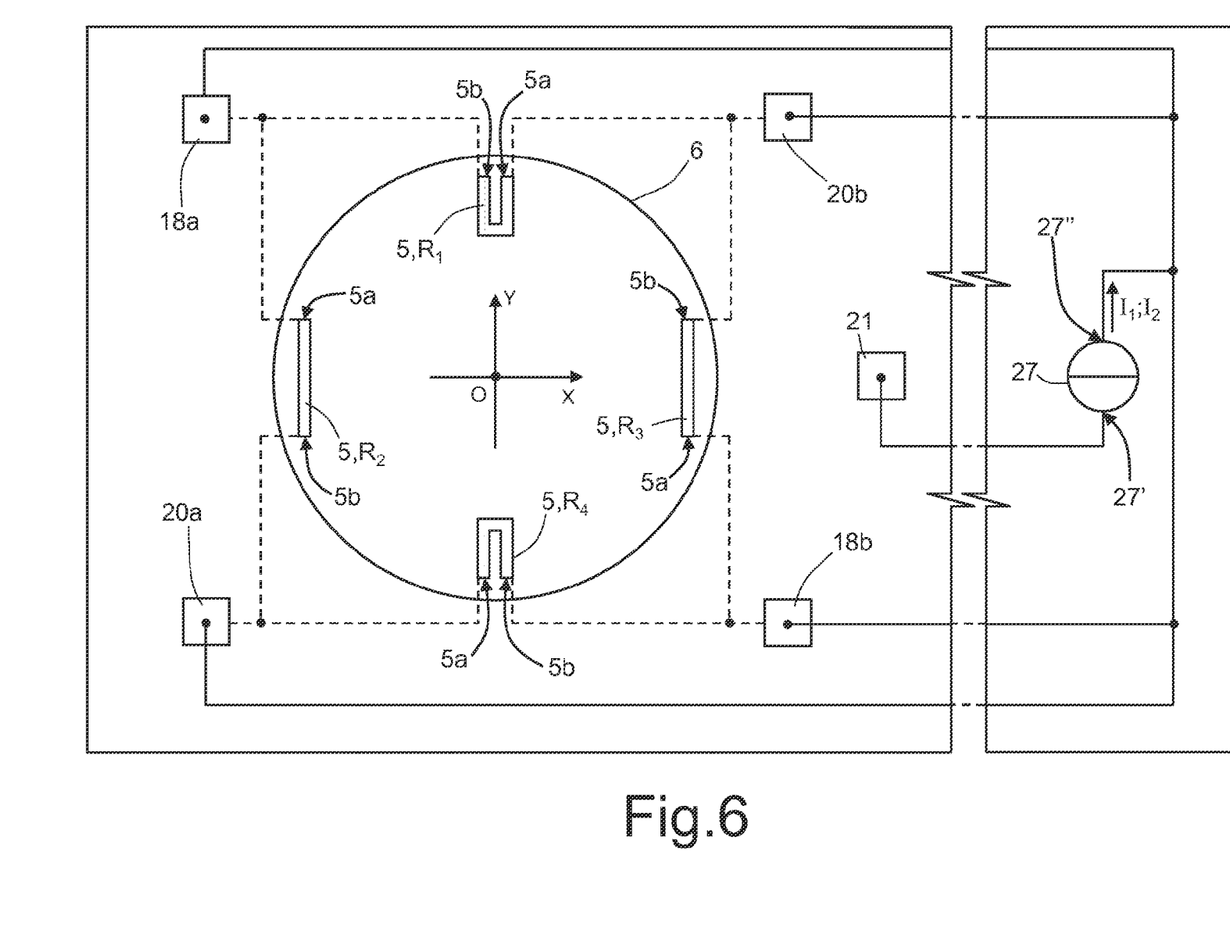
FIG. 6 shows, in top plan view, a MEMS piezoresistive pressure-sensor device coupled to an electrical circuit adapted to bias parasitic diodes of the transducer in order to obtain information regarding the temperature of the transducer.
Figure 7:
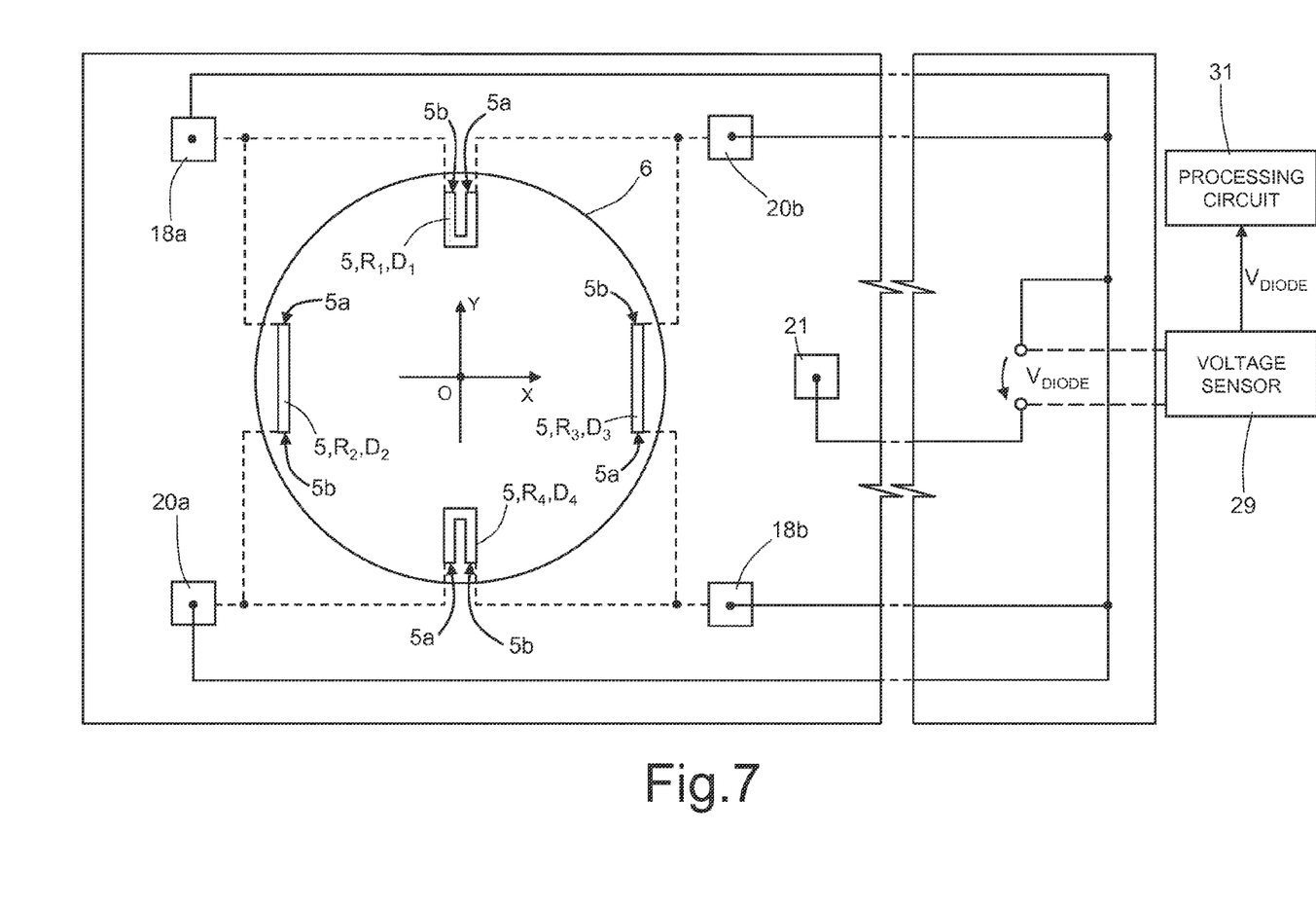
FIG. 7 shows, in top plan view, the MEMS piezoresistive pressure-sensor device of FIG. 6 coupled to an electrical circuit for reading the voltage across the parasitic diodes, when biased as shown in FIG. 6.

The ensuing description refers to FIGS. 6 and 7, which show, respectively, the HEMS sensor 100 biased in such a way that through the diode $D_{eq}$ there will flow a desired current (FIG. 6), and the MEMS sensor 100 during detection of the voltage $V_{DIODE}$ across the diode $D_{eq}$ (FIG. 7).

FIG. 6 shows a current generator 27 having a first conduction terminal 27' electrically coupled to the conductive pad 21 to the epitaxial layer 3 or substrate 2), and a second conduction terminal 27" electrically coupled to the conductive pads 18a, 18b, 20a, 20b.

In this way, the connection in parallel of the diodes D1-D4 shown in FIG. 5 is obtained. The current generator 27 is configured to supply a plurality of current values through the diodes D1-D4. In particular, as will be described more fully in what follows, the current generator 27 supplies to the diodes D1-D4 a first current $I_1$ and a second current $I_2$, of values different from one another.

FIG. 7 shows the transducer 100 of FIG. 6 during a different operating step, in particular, during a step of detection of the voltage $V_{DIODE}$ across the diodes D1-D4 (i.e., across the equivalent diode $D_{eq}$, between the terminal 21 and the terminals 18a, 18b, 20a, 20b; see also FIG. 5). The measurement of the voltage value $V_{DIODE}$ can be made by means of instrumentation 29 of a known type, for example by comparing the voltage $V_{DIODE1}$ with a reference voltage (Vref), storing output datum (for example, in a DSP), and then comparing $V_{DIODE2}$ with said voltage Vref and calculating the difference $\Delta V_{DIODE}$ between them.

The voltage value $V_{DIODE}$ thus measured is then used for subsequent processing operations (for example, performed by a generic integrated circuit 31 or some other data-processing circuit or device). The integrated circuit 31 comprises generic computing means, for example a microcontroller, or other computing means of a known type. The integrated circuit 31 performs the operation described, in what follows, by Eqs. (5) and (6), and, during calibration steps, the operations described by Eqs. (7)-(11b).

There now follows a detailed description, of the steps that lead to detection of the temperature by means of the configurations of the transducer 100 shown in FIGS. 6 and 7.

Through the diode $D_{eq}$, current $I_{DIODE}=I_1$ is made flow. When the current $I_1$ flows through it, the voltage $V_{DIODE}$ across the diode $D_{eq}$ can be expressed as $$V_{DIODE} = V_1 = nV_T \ln\left(\frac{I_1}{I_S}\right) \quad (3)$$

Then, the current $I_1$ is removed, and a current $I_{DIODE}=I_2$ is made to flow through the diode $D_{eq}$. When through the diode $D_{eq}$ a current $I_{DIODE}=I_2$ flows, the voltage $V_{DIODE}$ can be expressed as $$V_{DIODE} = V_2 = nV_T \ln\left(\frac{I_2}{I_S}\right) \quad (4)$$

The values of $I_1$ and $I_2$ are chosen, for example, in such a way that $I_1=10 \cdot I_2$. For example, $I_1=1$ μA and $I_2=10$ μA. It is evident that other values of $I_1$ and $I_2$ can be chosen, also using a different proportion (a factor different from 10) between $I_1$ and $I_2$.

The time interval in which the operations of application of the current $I_1$ and measurement of the voltage $V_1$ are performed is of the order of hundreds of microseconds. The time interval in which the operations of application of the current $I_2$ and measurement of the voltage $V_2$ are performed is of the order of hundreds of microseconds. When the current is applied across the diode, reading of the corresponding voltage is made after a minimum time has elapsed to reach stabilization of the output voltage $V_{DIODE}$.

The differential voltage $\Delta V_{DIODE}$ is hence given by Eq. (5)

$$\Delta V_{DIODE} = V_1 - V_2 = nV_T \ln\left(\frac{I_1}{I_S}\right) - nV_T \ln\left(\frac{I_2}{I_S}\right) = nV_T \ln\left(\frac{I_2}{I_1}\right) \quad (5)$$

Expressing the differential voltage $\Delta V_{DIODE}$ so as to render explicit the term corresponding to the temperature, we have $$\Delta V_{DIODE} = \alpha T \quad (6)$$

where $$\alpha = n\frac{KT}{q}\ln\left(\frac{I_2}{I_1}\right)$$

Hence, since the differential voltage $\Delta V_{DIODE}$ is proportional to the absolute temperature T of the diode $D_{eq}$, by measuring $\Delta V_{DIODE}$ a proportional measurement (with a proportionality factor equal to $\alpha$) of the temperature at which the diode $D_{eq}$ is found is obtained. Consequently, the value of temperature at which the piezoresistive elements 5 of the transducer 100 are subjected is obtained. With reference to FIG. 7, these operations are performed by the integrated circuit 31.

Figure 8:
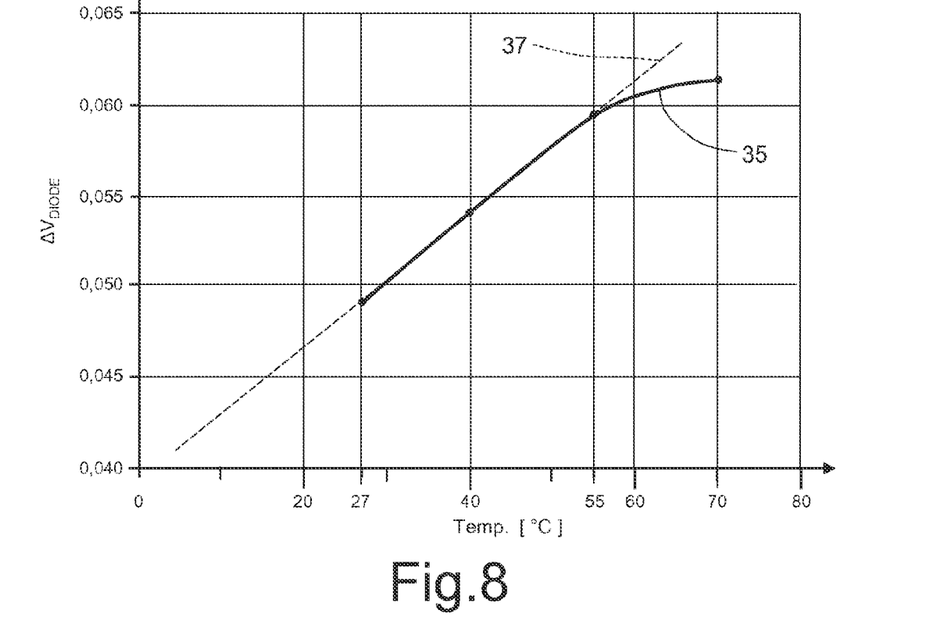
FIG. 8 shows a curve that describes the plot of the voltage across the parasitic diodes of the transducer of FIG. 7 as a function of the temperature.

FIG. 8 shows the plot of $\Delta V_{DIODE}$ as a function of the temperature (curve 35). The curve 35 identifies a possible plot of $\Delta V_{DIODE}$ and is not limited thereto. The values indicated on the axes are hence provided exclusively by way of example.

The present applicant has verified that the curve 35 of FIG. 8 can be approximated, for the purposes of practical interest, by a linear function 37. In this way, it is possible to take into account an effective value of $\alpha$ different from the theoretical value given previously, and moreover an offset factor $\beta$ that affects all the measurements of differential voltage $\Delta V_{DIODE}$.

Hence, it is assumed that the relation between the differential voltage $\Delta V_{DIODE}$ and the temperature T is linear, and is the following $$\Delta V_{DIODE} = \alpha \cdot T + \beta \quad (7)$$

From a practical standpoint, to calculate $\alpha$ and $\beta$ it is possible to proceed as described in what follows. A constant pressure within the range of pressures of use is applied to the suspended membrane 6. For example, considering a range of pressures comprised between approximately 200 mbar and 1300 mbar, a constant pressure is applied to the suspended membrane 6 of approximately 600 mbar. According to a different embodiment, the pressure applied to the suspended membrane 6 is a zero pressure. Then, maintaining the applied pressure constant, the temperature is made to vary. For example, the temperature is made to vary within the temperature range envisaged for use of the transducer 100, for example between −40° C. and +85° C. For example, two temperature values from among 27° C., 40° C., 55° C., and 70° C. are chosen. Thus, the transducer 100 and hence also the diode $D_{eq}$) is brought to a first controlled temperature value $T_{eq1}$ (for example, by putting the transducer 100 in an oven at adjustable temperature).

The temperature $T_{eq1}$ is, for example, 27° C. We have $$V_{DIODE1a} = \alpha \cdot T_{eq1} + \beta \quad (8)$$

where $V_{DIODE1a}$ is the direct-voltage value measured across $D_{eq}$ at the temperature $T_{eq1}$.

Then, the transducer 100 (and hence also the diode $D_{eq}$) is brought to a second controlled temperature value $T_{eq2} \neq T_{eq1}$. The temperature $T_{eq2}$ is, for example, 55° C. We have $$V_{DIODE2a} = \alpha \cdot T_{eq2} + \beta \quad (9)$$

where $V_{DIODE2a}$ is the direct-voltage value measured across $D_{eq}$ at the temperature $T_{eq2}$.

The value of $\alpha$ is given by $$\alpha = (V_{DIODE1a} - V_{DIODE2a})/(T_{eq1} - T_{eq2}) \quad (10)$$

The value of $\beta$ is given by $$\beta = V_{DIODE1a} - \alpha \cdot T_{eq1} \quad (11a)$$

or, equivalently $$\beta = V_{DIODE2a} - \alpha \cdot T_{eq2} \quad (11b)$$

What has been described here enables a linear association to be obtained between the voltage and temperature values such as to describe the behavior of the diode $D_{eq}$ in the linear region. It is evident that, if we wish to describe the behavior of the diode $D_{eq}$ outside the linear region, it is possible to determine a quadratic function by measuring a further voltage value $V_{DIODE}$ when a third temperature $T_{eq3} \neq T_{eq2} \neq T_{eq1}$ is applied to the transducer 100.

In use, the value of temperature $T_{eq}$ to which the diode $D_{eq}$ is subject can be corrected in real time by the integrated circuit 31 using the values $\alpha$ and $\beta$ thus calculated. Said values are calculated at start of life of the pressure sensor, and are stored in a memory internal to the integrated circuit 31.

According to one embodiment, the steps described for obtaining the temperature at which the transducer 100 is found are performed whenever the transducer 100 must be used for sensing a pressure that acts on the suspended membrane 6. According to a different embodiment, the steps described for obtaining the temperature at which the transducer 100 is found are performed at regular intervals, and not each time the transducer 100 is used.

During the standard operations of the transducer 100, i.e., for sensing a pressure that acts on the suspended membrane 6, the value of temperature $T_{eq}$ detected can be used for correcting the voltage value Vo supplied at output by the transducer 100 itself (output of the Wheatstone bridge, between the terminals 20a and 20b of FIGS. 3 and 4), as per the known art. The method of correction of the voltage Vo, in itself known, does not form the subject of the present invention and hence is not described herein.

Figure 9:
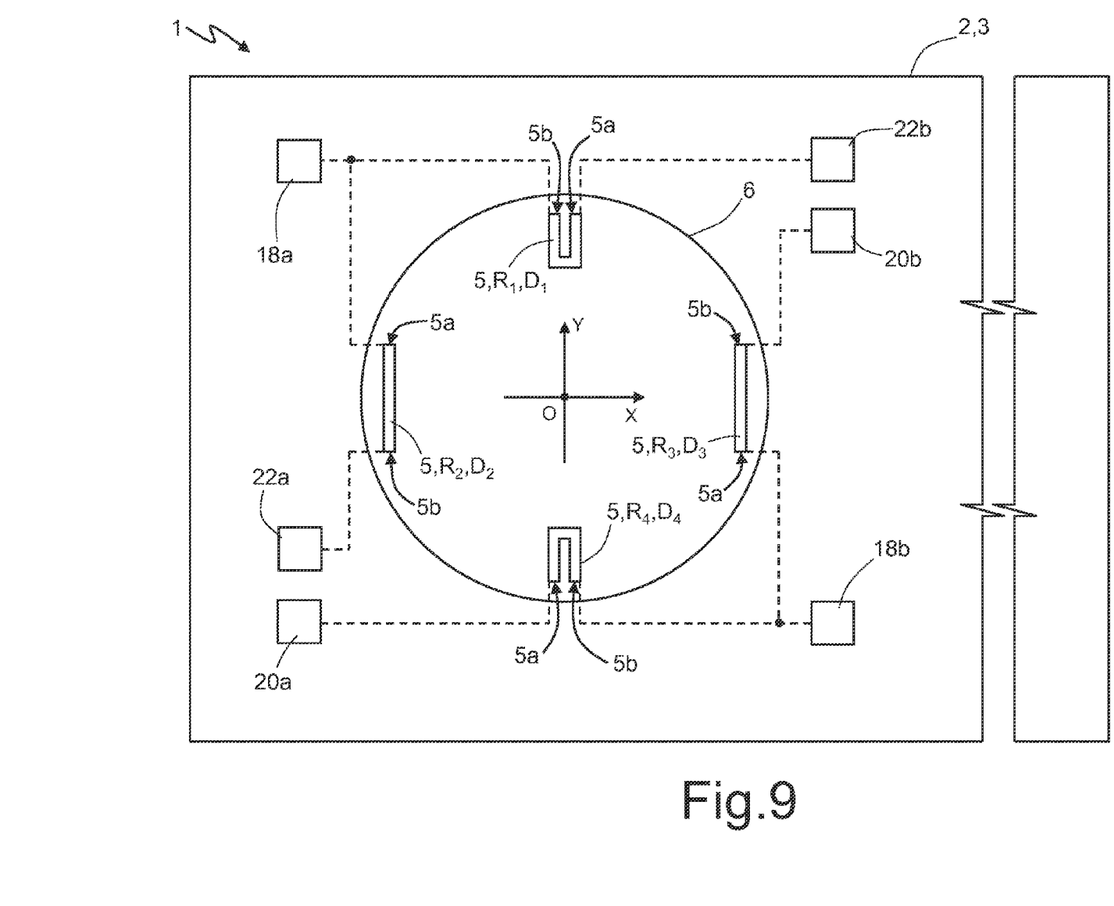
FIG. 9 shows, in top plan view, a MEMS piezoresistive pressure-sensor device.

FIG. 9 shows, in the same top plan view of the transducer 100 as that of FIG. 3, a further embodiment for operation of the diode formed by the PN junction formed by the piezoresistors 5 and by the epitaxial layer 3.

According to this embodiment, two further electrical-contact pads 22a and 22b are present.

The pad 22a is connected to the conduction terminal 5b of the piezoresistor 5, which, during use for measuring the temperature, forms the diode D2. The pad 22b is connected to the conduction terminal 5a of the piezoresistor 5 that, during use for measuring the temperature, forms the diode D1. The remaining electrical-contact pads 18a, 18b are unaltered as compared to the embodiment of FIG. 3. The electrical-contact pads 20a and 20b are respectively connected, in a way similar to the embodiment of FIG. 3, to the conduction terminals 5a and 5b of the piezoresistors 5 that, during use for measuring the temperature, or the diodes D4 and D3, but, unlike what is shown in FIG. 3, in this case the electrical-contact pads 20a and 20b are not connected to the diodes D1 and D2.

Figure 10A:
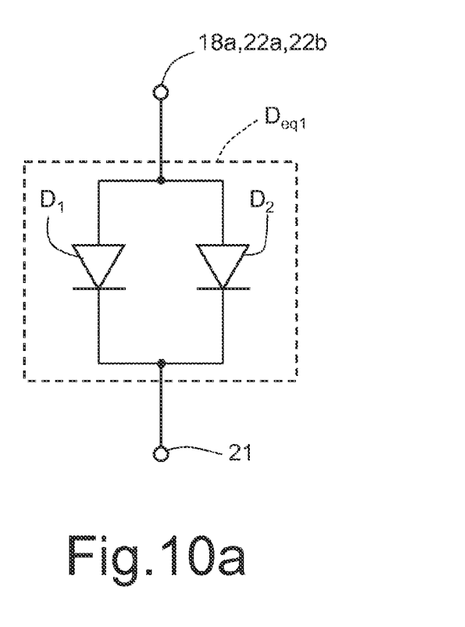
FIGS. 10a and 10b show an equivalent electrical circuit of parasitic diodes of the transducer of FIG. 9.
Figure 10B:
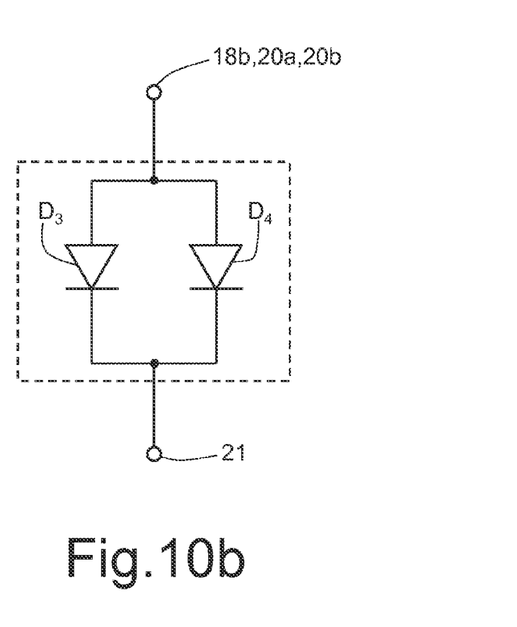

This configuration enables a first connection in parallel between the diodes D1 and D2 (FIG. 10a) and a second connection in parallel between the diodes D3 and D4 (FIG. 10b).

The operations of detection of the temperature are similar to the ones described previously. However, in this case, for carrying out the operations according to Eqs. (1)-(6), two equivalent diodes are available, i.e., the equivalent diode $D_{eq}$ as previously identified and described, plus an equivalent diode $D_{eq2}$ given by the parallel of D1 and D2, and connected between the terminal 21 and the terminals 18a, 22a, 22b. The equivalent diode $D_{eq\_2}$ considered can be, indifferently, the diode given by the parallel of D3 and D4, and connected between the terminal 21 and the terminals 18b, 20a, 20b.

When a current flows through the diode $D_{eq}$, the voltage $V_{DIODE}$ can be expressed according to the aforementioned Eq. (3) reproduced below for convenience $$V_{DIODE} = V_1 - nV_T \ln\left(\frac{I_1}{I_s}\right)$$

When one and the same current $I_1$ is made to flow through the equivalent diode $D_{eq\_2}$, across it there is set up a voltage $V_{DIODE\_2}$ that can be expressed as $$V_{DIODE\_2} = V_1 - nV_T \ln\left(\frac{I_1}{I_{s\_2}}\right) \quad (12)$$

The value of $I_{S\_2}$ is different from the value of $I_S$ according to Eq. (3), in so far as it corresponds to a diode having an area different from that of the diode $D_{eq}$. The values of $V_{DIODE}=V_1$ and $V_{DIODE\_2}$ are consequently different from one another.

The value of $I_1$ is chosen, for example, equal to 1 µA, to limit the current consumption. It is evident that other values of $I_1$ can be chosen, according to the need.

The differential voltage $\Delta V_{DIODE}$ is hence, in this case, given by $$\Delta V_{DIODE} = V_1 - V_{DIODE\_2}.$$

By expressing the differential voltage $\Delta V_{DIODE}$ so as to render explicit the term corresponding to the temperature, also in this case there is obtained a value of $\Delta V_{DIODE}$ that varies linearly with the temperature.

Consequently, since the differential voltage $\Delta V_{DIODE}$ is proportional to the absolute temperature T (common to the diodes $D_{eq}$ and $D_{eq\_2}$), by measuring $\Delta V_{DIODE}$ a measurement is obtained proportional to the temperature to be measured. Consequently, the value of temperature to which the piezoresistive elements 5 of the MEMS sensor 100 are subjected is obtained.

By applying equations similar to Eqs. (8)-(11b) it is possible to obtain the parameters that describe the variation, assumed linear, of the voltage difference $\Delta V_{DIODE}$ with the temperature.

When the MEMS sensor 100 is operated for sensing a pressure applied to the suspended membrane 6, reading of the voltage at output Vo from the Wheatstone bridge requires that the output signal at positive potential Vo⁺ be picked up at the terminals 20a and 22a simultaneously and that the output signal at negative potential Vo⁻ be picked up at the terminals 20b and 22b simultaneously.

This embodiment presents the advantage, as compared to the one described with reference FIGS. 5-7, of requiring a single current value ($I_1$) for carrying out the measurement of the temperature. By choosing a value of current $I_1$ that is sufficiently low, it is possible to reduce the current consumption. In addition, since a single current generator is used, configured to operate at the same value of current $I_1$, there are no mismatches that, instead, may be observed in the case of use of different generators or of one and the same generator operated for supplying currents of different value. On the other hand, however, two further conductive pads as compared to the case of FIGS. 3, 6 and 7 are required.

Figure 11:
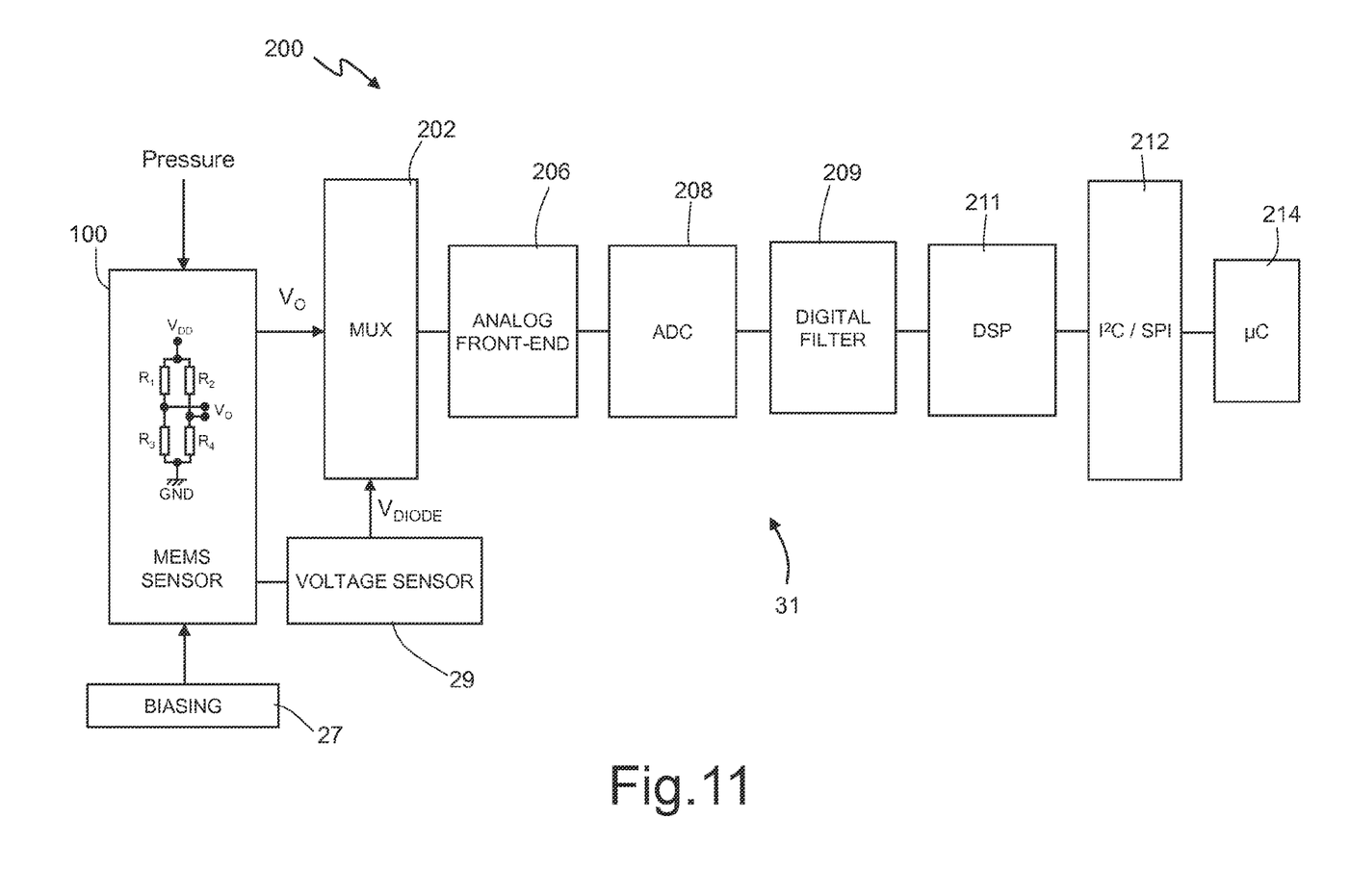
FIG. 11 shows a pressure sensor comprising a MEMS piezoresistive pressure-sensor device.

FIG. 11 shows, with a block diagram, a pressure sensor 200 provided with the MEMS sensor 100 and a plurality of blocks for processing the signals Vo and $V_{DIODE}$ (or $\Delta V_{DIODE}$).

The processing blocks comprise a multiplexer (MUX) 202, connected to the MEMS sensor 100, for receiving the output signal Vo of the Wheatstone bridge (voltage signal correlated to the pressure to which the membrane 6 is subjected in use). The multiplexer 202 moreover receives at input a signal correlated to the temperature at which the MEMS sensor 100 operates. According to one embodiment, the multiplexer 202 compares the voltage $V_{DIODE1}$ with the reference voltage Vref, storing the output datum in a digital processor 211 (e.g., a DSP), and then compares the voltage $V_{DIODE2}$ with the same reference voltage Vref for calculating the difference $\Delta V_{DIODE}$ thereof.

The output of the multiplexer 202 is supplied to an analog front-end 206, including a low-noise capacitive amplifier, which converts the resistive and non-balanced signal of the MEMS sensor 100 into an analog voltage signal. The output of the analog front-end 206 is supplied to an analog-to-digital converter 208, which converts the analog voltage signal into a digital binstream. The analog-to-digital converter 208 is coupled to a reconstruction filter 209 (optional), which removes the high-frequency components of the quantized noise present in the digital bitstream and supplies at output digital words at high resolution. The pressure values thus processed can be supplied to a microcontroller 214 by means of an interface circuit 212 (I²C/SPI interface). Moreover present between the reconstruction filter 209 and the interface circuit 212 is the digital processor 211, designed for carrying out operations of temperature compensation, according to steps in themselves known. The values of α and β as previously defined, for calibration of the temperature sensor, can be stored in a nonvolatile memory internal to the DSP 211.

From an examination of the characteristics provided according to the present disclosure the advantages that it affords are evident.

In particular, it enables: a reduction of the warm-up times thanks to in situ reading of the temperature of the pressure sensor; a saving of area using the same MEMS sensor with the dual function of pressure sensor and of temperature sensor, exploiting the integrated diodes already present following upon the step of fabrication and formation of the piezoresistors; finally, according to some embodiments of the present invention, no dedicated pads are necessary in the MEMS sensor so that the area and layout of the sensor remain the same as per the known art.

Finally, it is clear that modifications and variations may made to the invention described and illustrated herein, without thereby departing from the sphere of protection of the present invention, as defined in the annexed claims.

In particular, the description refers to a wafer 1 that houses the pressure sensor.

However, what has been described can obviously be applied to pressure sensors housed in a chip, or die, i.e., after the operation of dicing of the wafer 1.

In addition, according to other embodiments, the conductivities N and P can be exchanged with one another with respect to what has been described previously. In particular, the piezoresistors can be formed by implanted regions of an N type, and the epitaxial layer 3 and the substrate 2 are of a P type.

Moreover, the present invention is not limited to the embodiment of the suspended membrane described and illustrated herein, but can be applied to any piezoresistive pressure sensor in which the piezoresistors form a PN junction with an underlying layer or substrate.

Finally, the teaching according to the present invention can be applied to any sensor or transducer the output signal of which depends upon the operating temperature of the sensor itself and consequently must be corrected or compensated.

What is claimed is:

1. A method for sensing a temperature of a transducer having a body made of a semiconductor material having a first type of conductivity and including a doped region of a second type of conductivity forming a first resistor transducer element having first and second terminals, said doped region forming the first resistor transducer element further forming with said body a first junction diode, the method comprising:
   applying a first current to one of the first and second terminals of the first resistor transducer element to pass through said first junction diode;
   detecting a first voltage value across said first junction diode in response to the first current; and
   correlating said detected first voltage value to a value of a temperature of said first junction diode.

2. The method according to claim 1, wherein said transducer is a pressure sensor, the body forming a flexible membrane, and said first resistive transducer element is a piezoresistor.

3. The method according to claim 1, further comprising:
   applying a second current, having a value different from the value of the first current, to one of the first and second terminals to pass through said first junction diode;
   detecting a second voltage value across said first junction diode in response to the second current;
   carrying out an operation of subtraction between the first and the second voltage values to obtain a difference value; and
   associating said difference value to said value of temperature of said first junction diode.

4. The method according to claim 3, wherein associating comprises carrying out a linear association.

5. A method for sensing a temperature of a transducer having a body made of a semiconductor material having a first type of conductivity and including a first transducer element having a second type of conductivity and a second transducer element having the second type of conductivity, said first transducer element forming with said body a first junction diode and said second transducer element forming with said body a second junction diode, said first and second junction diodes being connected in parallel between common conduction terminals, the method comprising:
   biasing the common conduction terminals so as to generate a first current through the first and second junction diodes;
   detecting a first voltage value across the common conduction terminals when the first current is supplied;
   biasing the common conduction terminals so as to generate a second current, having a value different from the value of the first current, through the first and second junction diodes;
   detecting a second voltage value across said common conduction terminals when the second current is supplied;
   carrying out an operation of subtraction between the first and second voltage values to obtain a difference value; and
   associating said difference value to a value of temperature of said first and second junction diodes.

6. A method for sensing a temperature of a transducer having a body made of a semiconductor material having a first type of conductivity and including a first transducer element having a second type of conductivity and a second transducer element having the second type of conductivity, said first transducer element forming with said body a first junction diode and said second transducer element forming with said body a second junction diode, the method comprising:
   generating a first current through said first junction diode;
   detecting a first voltage value across said first junction diode when the first current is supplied;
   generating a second current equal to the first current through said second junction diode;
   detecting a second voltage value across said second junction diode when the second current is supplied;
   carrying out an operation of subtraction between the first voltage value and the second voltage value to obtain a difference value; and
   associating said difference value to a value of temperature of said first and second junction diodes.

7. A transducer, comprising:
   a body made of semiconductor material having a first type of conductivity;
   a doped region of a second type of conductivity forming a first resistor transducer element, extending in said body between first and second terminals, said doped region further forming with said body a first junction diode;
   a current generator configured to supply a first current to one of the first and second terminals of the first resistor transducer element to pass through the first junction diode;
   a voltage-measuring device configured to detect a first voltage value across the first junction diode when the first current is supplied; and
   a processing device configured to acquire the first voltage value detected and correlate said first voltage value to a value of temperature of the first junction diode.

8. The transducer according to claim 7, wherein:
   the current generator is moreover configured to supply a second current, having a value different from the value of the first current, to the first junction diode;
   the voltage-measuring device is moreover configured to detect a second voltage value across the first junction diode when the second current is supplied; and
   the processing device is moreover configured to: acquire the second value of the voltage detected; carry out an operation of subtraction between the first value and the second value of the voltage detected to obtain a difference value; and associate said difference value to said value of temperature of said first junction diode.

9. The transducer according to claim 8, wherein the processing device is moreover configured to carry out a linear association between the difference value and the temperature value.

10. A transducer, comprising:
a body made of semiconductor material having a first type of conductivity;
a first transducer element, extending in said body, having a second type of conductivity, and forming with said body a first junction diode;
a second transducer element, extending in said body, having the second type of conductivity and forming with said body a second junction diode, said first and second junction diodes being connected in parallel between common conduction terminals,
a current generator configured to supply a first current and a second current to the common conduction terminals, the second current having a value different from the value of the first current,
a voltage-measuring device configured to detect a first voltage value across the common conduction terminals when the first current is supplied, and detect a second voltage value across the common conduction terminals when the second current is supplied, and
a processing device configured to carry out an operation of subtraction between the first voltage value and the second voltage value to obtain a difference value and associate said difference value to a value of temperature of said first and second junction diodes.

11. The transducer according to claim 10, further comprising a third transducer element and a fourth transducer element having the second type of conductivity, said third and fourth transducer elements forming with said body a respective third junction diode and fourth junction diode, said first, second, third and fourth junction diodes being connected in parallel between said common conduction terminals,
said first, second, third, and fourth transducer elements being moreover connected together to form a Wheatstone bridge.

12. The transducer according to claim 11, wherein the body is a flexible membrane, and said first, second, third, and fourth transducer elements are piezoresistors diffused in the sensing structure, said transducer being a pressure sensor.

13. The transducer according to claim 12, wherein said first, second, third, and fourth transducer elements have a respective value of resistance that varies as a function of the pressure applied to the flexible membrane.

14. A transducer, comprising:
a body made of semiconductor material having a first type of conductivity;
a first transducer element, extending in said body, having a second type of conductivity, and forming with said body a first junction diode;
a second transducer element, extending in said body, having the second type of conductivity and forming with said body a second junction diode,
a current generator configured to supply a first current through the first junction diode and configured to supply a second current, equal to the first current through the second junction diode, and
a voltage-measuring device configured to sense a first voltage value across the first junction diode when the first current is supplied and configured to sense a second voltage value across the second junction diode when the second current is supplied; and
a processing device configured to: acquire the first voltage value; acquire the second voltage value; carry out an operation of subtraction between the first voltage value and the second voltage value to obtain a difference value; and associate said difference value to a value of temperature of said first and second junction diodes.

15. An apparatus, comprising:
a membrane formed of a first conductivity type semiconductor material;
a doped region of a second conductivity type semiconductor material in said membrane forming a first piezoresistive sensor element having first and second terminals;
said doped region in said membrane that forms the first piezoresistive sensor element further forming with the membrane a first junction diode; and
a circuit coupled to the first junction diode through one of said first and second terminals and configured to sense a voltage across the first junction diode in response to application of a current to one of the first and second terminals and determine from the sensed voltage a temperature of the first junction diode.

16. The apparatus of claim 15, wherein the current comprises a first current and a second current, and wherein the voltage comprises a corresponding first voltage and second voltage, said second circuit further configured to obtain a difference between the first and second voltages and determine from the voltage difference said temperature of the first junction diode.

17. The apparatus of claim 15, further comprising a second piezoresistive sensor element formed of the second conductivity type semiconductor material and coupled to the first piezoresistive sensor element in a bridge circuit, the second piezoresistive sensor element and membrane forming a second junction diode,
wherein the circuit is coupled to the first and second junction diodes and configured to sense a voltage across the first and second junction diodes in response to application of said current and determine from the sensed voltage a temperature of the first and second junction diodes.

* * * * *

UNITED STATES PATENT AND TRADEMARK OFFICE
CERTIFICATE OF CORRECTION

PATENT NO. : 9,534,974 B2
APPLICATION NO. : 13/757146
DATED : January 3, 2017
INVENTOR(S) : Michele Vaiana et al.

It is certified that error appears in the above-identified patent and that said Letters Patent is hereby corrected as shown below:

In the Specification

At Column 1, Line number 34, replace [[determining variation]] with -- determining a variation --.
At Column 2, Line number 24, replace [[Tiang]] with -- Uang --.
At Column 2, Line number 52, replace [[structure first]] with -- structure a first --.
At Column 3, Line number 17, replace [[In embodiment]] with -- In an embodiment --.
At Column 3, Line number 32, replace [[reference the]] with -- reference to the --.
At Column 4, Line number 17, replace [[as known]] with -- as is known --.
At Column 4, Line number 35, replace [[3, dopant]] with -- 3, of dopant --.
At Column 5, Line numbers 12-13, replace [[1 at distance]] with -- 1 at a distance --.
At Column 6, Line number 61, replace [[operation subtraction]] with -- operation of subtraction --.
At Column 7, Line number 67, replace [[HEMS]] with -- MEMS --.
At Column 8, Line number 24, replace [[storing output]] with -- storing the output --.
At Column 11, Line number 22, replace [[current flows]] with -- current $I_{DIODE}=I_1$ flows --.
At Column 13, Line number 2, replace [[may made to]] with -- may be made to --.

Signed and Sealed this
Twenty-first Day of March, 2017

Michelle K. Lee
*Director of the United States Patent and Trademark Office*